US011383341B2

(12) United States Patent
Kumazaki

(10) Patent No.: US 11,383,341 B2
(45) Date of Patent: Jul. 12, 2022

(54) MACHINING DEVICE

(71) Applicant: FUJI CORPORATION, Chiryu (JP)

(72) Inventor: Shinya Kumazaki, Toyota (JP)

(73) Assignee: FUJI CORPORATION, Chiryu (JP)

(*) Notice: Subject to any disclaimer, the term of this patent is extended or adjusted under 35 U.S.C. 154(b) by 20 days.

(21) Appl. No.: 16/651,155

(22) PCT Filed: Oct. 5, 2017

(86) PCT No.: PCT/JP2017/036288
§ 371 (c)(1),
(2) Date: Mar. 26, 2020

(87) PCT Pub. No.: WO2019/069426
PCT Pub. Date: Apr. 11, 2019

(65) Prior Publication Data
US 2020/0238462 A1 Jul. 30, 2020

(51) Int. Cl.
B23Q 17/09 (2006.01)
B23B 3/16 (2006.01)
(Continued)

(52) U.S. Cl.
CPC ..... B23Q 17/0995 (2013.01); B23Q 3/15546 (2013.01); B23B 3/161 (2013.01); B23B 29/242 (2013.01)

(58) Field of Classification Search
CPC . Y10T 29/5154; Y10T 29/519; Y10T 408/37; Y10T 483/136; Y10T 483/138;
(Continued)

(56) References Cited

U.S. PATENT DOCUMENTS 3,918,331 A * 11/1975 Svanstrom ................ B23B 3/06
82/121
RE29,694 E * 7/1978 Foil ......................... B23B 3/161
29/36
(Continued)

FOREIGN PATENT DOCUMENTS

DE 2429330 A1 * 1/1976 ........... B23Q 3/1554
DE 2737664 A1 * 2/1979 ............. B23B 3/161
(Continued)

OTHER PUBLICATIONS

International Search Report dated Nov. 28, 2017 in PCT/JP2017/036288 filed Oct. 5, 2017, 2 pages.

Primary Examiner — Boyer D Ashley
Assistant Examiner — Michael Vitale
(74) Attorney, Agent, or Firm — Oblon, McClelland, Maier & Neustadt, L.L.P.

(57) ABSTRACT

A machine tool configured to attach multiple tools to a turret is provided to improve the efficiency of a tool exchanging operation and, thus, also the production efficiency. A control device determines whether an expired tool, which is a tool needs to be exchanged, is present among the tools held by the turret. The control device sets a tool exchanging position, which is a position within the movable range of a head section and is a position where the expired tool is exchanged with a new tool. If the control device determines that an expired tool is present, the control device causes a head section driving device to move the head and rotate the turret to position the expired tool at the tool exchanging position.

6 Claims, 10 Drawing Sheets

(51) Int. Cl.
  *B23B 29/24* (2006.01)
  *B23Q 3/155* (2006.01)

(58) Field of Classification Search
  CPC ........ Y10T 483/12–15; B23Q 3/15503; B23Q 3/1554; B23Q 3/15713; B23Q 17/0995; B23Q 2003/155411; B23Q 3/15533; B23Q 3/15546; B23B 3/161; B23B 29/242; B23B 29/34; G05B 19/408; G05B 19/4093
  USPC ................ 483/1, 4–13; 408/35; 29/33 J, 39; 700/180, 185
  See application file for complete search history.

(56) References Cited

U.S. PATENT DOCUMENTS

| | | | | |
|---|---|---|---|---|
| 4,700,442 A | * | 10/1987 | Lahm | B23B 3/161 29/39 |
| 5,007,151 A | * | 4/1991 | Gusching | B23B 3/161 29/27 C |
| 5,274,562 A | | 12/1993 | Suzuki | |
| 6,584,415 B1 | * | 6/2003 | Uneme | G05B 19/4065 702/33 |
| 2001/0037888 A1 | * | 11/2001 | Akamatsu | B23Q 5/341 173/2 |
| 2013/0331245 A1 | * | 12/2013 | Koike | B23Q 3/15533 483/54 |
| 2016/0067840 A1 | * | 3/2016 | Fujimoto | B25J 5/02 483/58 |
| 2019/0047101 A1 | * | 2/2019 | Takiguchi | G05B 19/409 |

FOREIGN PATENT DOCUMENTS

| | | | | |
|---|---|---|---|---|
| DE | 2950934 A1 | * | 6/1981 | ......... B23Q 3/15506 |
| DE | 4312563 A1 | * | 10/1994 | ............. B23Q 1/621 |
| DE | 4416712 A1 | * | 11/1994 | ......... B23Q 3/15713 |
| JP | 2-53542 A | | 2/1990 | |
| JP | 4-122543 A | | 4/1992 | |
| JP | 5-104372 A | | 4/1993 | |
| JP | 5-261639 A | | 10/1993 | |
| JP | 2000-308936 A | | 11/2000 | |

* cited by examiner

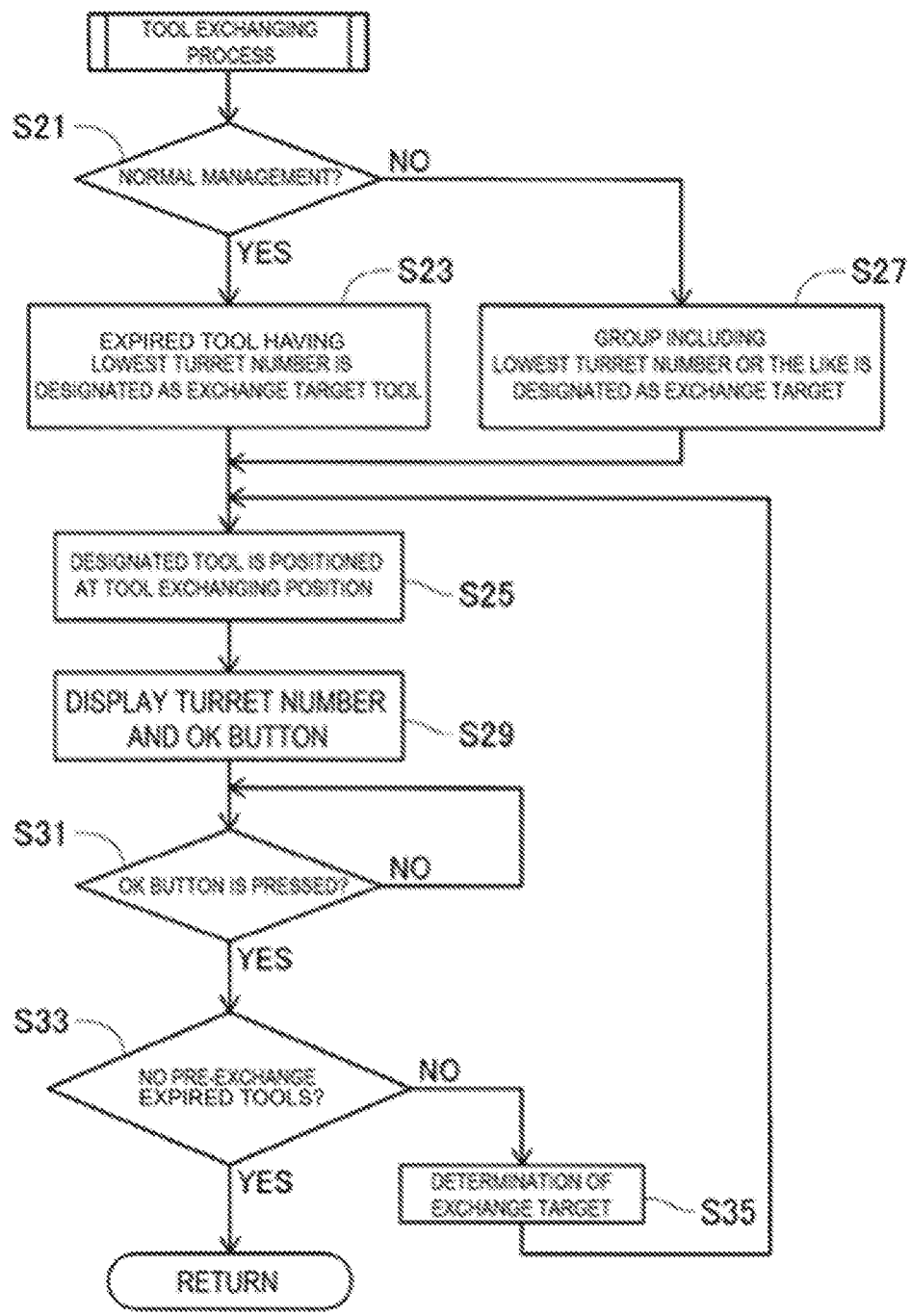

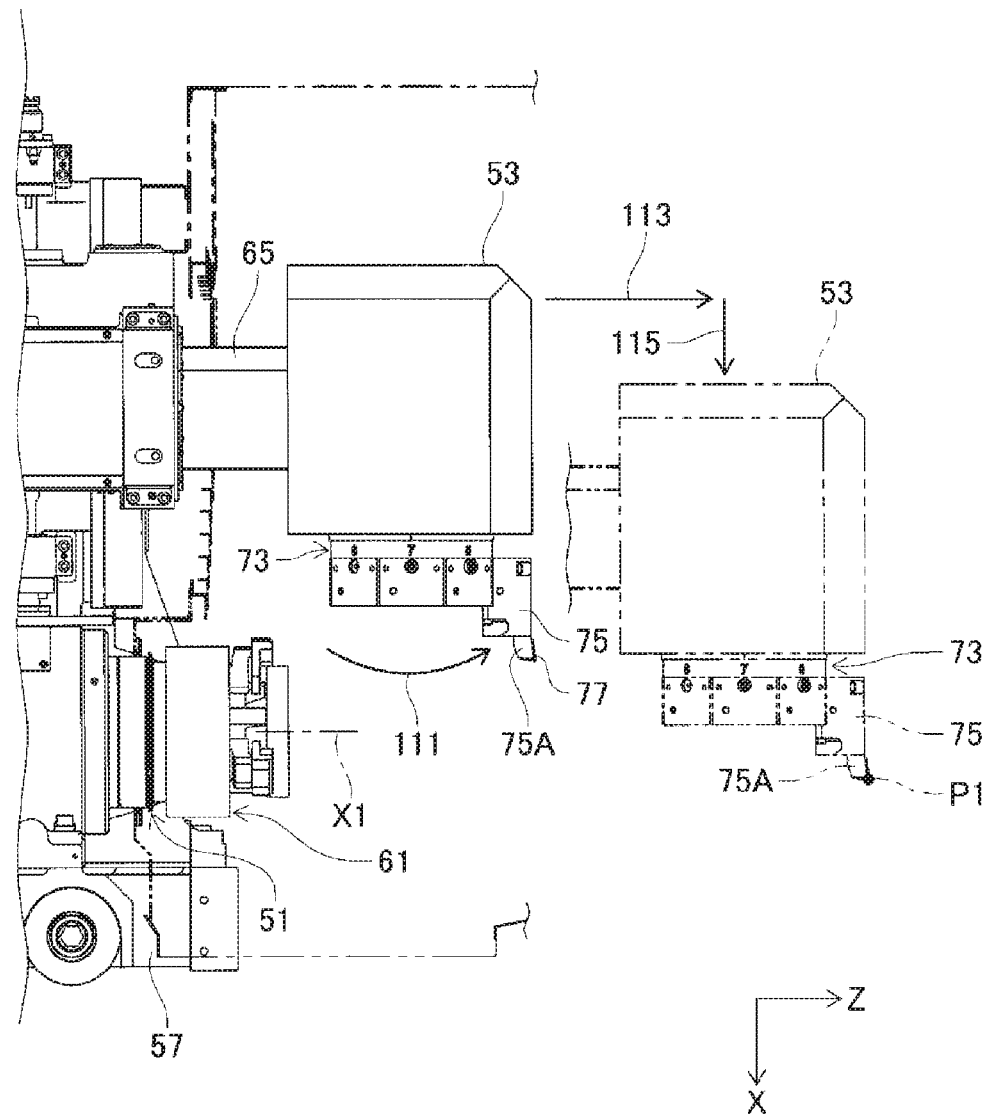

MACHINING DEVICE

TECHNICAL FIELD

The present application relates to a machine tool for performing various types of operations on a workpiece by means of a tool attached to a turret.

BACKGROUND ART

Heretofore, there has been proposed a machine tool for performing various types of operations, such as drilling, lathing, polishing, and inspecting, on a workpiece. For example, the machine tool disclosed in Patent Literature 1 includes a tool magazine, a main spindle, and an auxiliary magazine. The tool magazine is provided with multiple gripping mechanisms at the outer periphery of a rotating body. An exchangeable tool is gripped by each of the multiple gripping mechanisms. When a tool is to be exchanged, the spindle moves to the position of the tool magazine and, after a tool in use is gripped by an available gripping mechanism, the spindle receives a new tool from another gripping mechanism. By exchanging tools, the spindle performs various types of operations on a workpiece with the tools.

In this machine tool, a tool which cannot be used due to elapsed service expired, breakage, or the like (hereinafter, such a tool will sometimes be referred to as an "expired tool") is disposed at a tool exchanging position. Specifically, when the tool reaches the end of its useful life or the tool breaks during use, the spindle conveys the tool, that is, the expired tool, to an auxiliary magazine disposed at the tool exchanging position. The auxiliary magazine can be moved between the tool exchanging position and a retracted position by the manual operation of an operator. The operator moves the auxiliary magazine to the retracted position and exchanges the expired tool with a new tool.

PATENT LITERATURE

Patent Literature 1: JP-A-2000-308936

BRIEF SUMMARY

Technical Problem

In the above-mentioned machine tool, one tool, from among multiple tools arranged in a tool magazine, is attached to the main spindle, and various operations are performed on a workpiece by the tool. That is, one tool is attached to the rotating main spindle, and work is performed by the tool. Another variation of this is a machine tool provided with a turret in a head section, where work is performed on a workpiece, wherein multiple tools are attached to the outer periphery of the turret. In this type of machine tool, the turret is rotated, and various types of operations are performed on a workpiece by exchanging a tool to be used.

In the machine tool of Patent Literature 1 described above, since only one tool is attached to the main spindle, when the tool attached to the main spindle becomes an expired tool, the expired tool could be exchanged by moving the main spindle to a tool exchanging position. However, in the machine tool provided with the turret described above, the exchanging operation of the expired tool is difficult because the position of the tool in the head section changes from time to time with rotations of the turret, that is, changes with the tool to be used.

It is therefore an object of the present disclosure to provide a machine tool configured to attach multiple tools to a turret, wherein the efficiency of the tool exchanging operation is improved, thereby improving the production efficiency.

Solution to Problem

The present application comprises a machine tool, including: a spindle configured to hold a workpiece and rotate about a first rotation axis; a head section disposed above the spindle configured to perform an operation on the workpiece with a tool; a head section driving device for driving the head section; and a control device;

wherein the head section has a turret, being configured to hold the tool held at the outer periphery of the turret, which is rotatable about a second rotation axis along a direction orthogonal to the first rotation axis; wherein the control device further comprises: a determination section configured to determine whether an expired tool, which is a tool needs to be exchanged, is present among the tools held by the turret, and an exchanging position setting section configured to set a tool exchanging position which is a position within the movable range of the head section and is a position for exchanging the expired tool with a new tool; and when the determination section determines that the expired tool is present, the control device causes the head section driving device to move the head section with rotating the turret to dispose the expired tool at the tool exchanging position.

Advantageous Effects

With the machine tool of the present disclosure, when an expired tool is present, the control device moves the head section and rotates the turret in order to dispose the expired tool at the tool exchanging position. Thus, even when there are changes to the position of the expired tool in the head section due to rotations of the turret in response to work contents, when the expired tool is to be exchanged, the expired tool can be automatically moved to a predetermined tool exchanging position. As a result, it is possible to improve the efficiency of the tool exchanging operation and, thus, also the production efficiency in a machine tool provided with a turret.

BRIEF DESCRIPTION OF DRAWINGS

FIG. 9 A flowchart showing the processing procedure of a tool exchanging process.

FIG. 10 A side view showing a state of moving a first tool to a tool exchanging position after rotating a turret.

DESCRIPTION OF EMBODIMENTS

Figure 1:
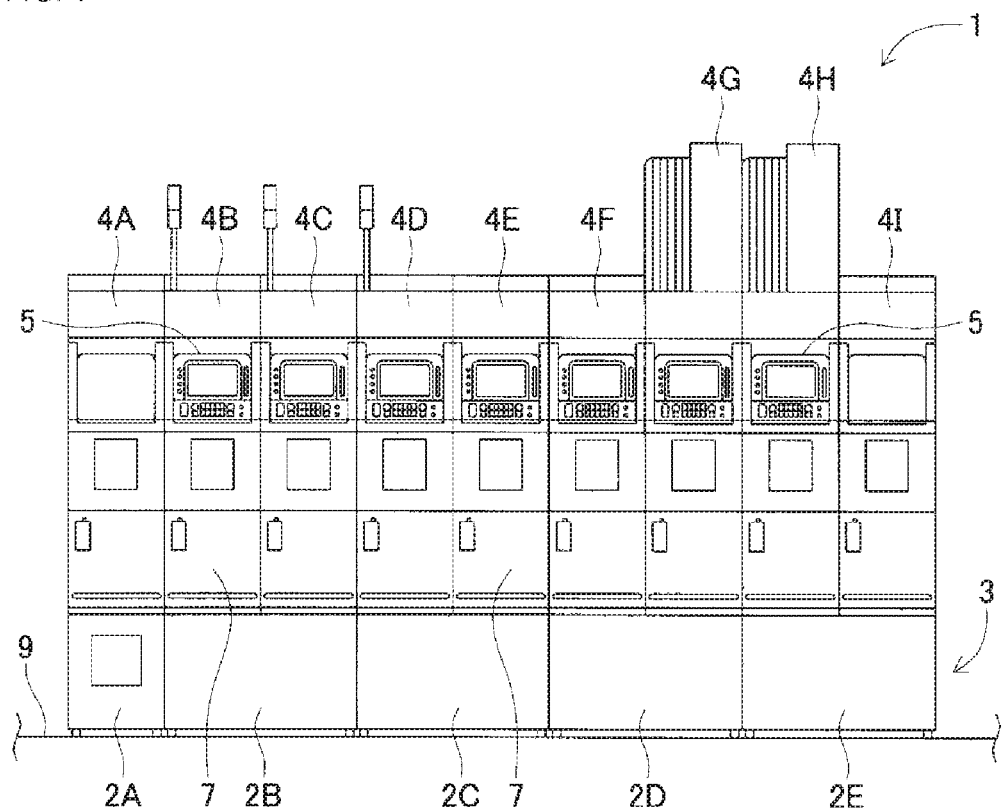
FIG. 1 An external front view of the machine tool device of the present embodiment.

Hereinafter, an embodiment of the machine tool of the present disclosure will be described in detail with reference to the drawings. First, the overall configuration of machine tool device 1 of the present embodiment will be described with reference to FIG. 1. FIG. 1 is an external front view of machine tool device 1 of the present embodiment.

Overall Configuration of Machine Tool Device

As shown in FIG. 1, machine tool device 1 of the present embodiment includes base 3 having multiple base units 2A to 2E (five in this embodiment), and multiple work machine modules 4A to 4I (nine in this embodiment) arranged on base 3. In machine tool device 1, a machine tool for performing various types of work on a workpiece is modularized, and multiple work tool modules 4A to 4I constitute one line. Machine tool device 1 of the present embodiment performs, for example, sequential work on one workpiece with multiple work machine modules 4A to 4I.

As shown in FIG. 1, normally, two work machine modules are arranged for one base unit, but configurations are possible in which only one work machine module is disposed for one base unit, or in which three or more work machine modules are arranged for one base unit. For example, in the example shown in FIG. 1, one work machine module 4A is disposed in leftmost base unit 2A, and two work machine modules 4B to 4I are disposed in the other base units 2B to 2E.

In the following description, the up-down direction when machine tool device 1 shown in FIG. 1 is viewed from the front is referred to as the X-direction, the left-right direction is referred to as the Y-direction, and the front-rear direction is referred to as the Z-direction. That is, the left-right direction in which work machine modules 4A to 4I are arranged is the Y-direction, and the depth direction of machine tool device 1 that intersects the arrangement direction of work machine modules 4A to 4I is the Z-direction.

The multiple work machine modules 4A to 4I are arranged in a row along the Y-direction and constitute a single line. In addition, work machine modules 4A to 4I are arranged at equal intervals in such a manner that their side walls are close to each other. Among work machine modules 4A to 4I, as will be described later, there are multiple types of modules whose work contents differ depending on the workpiece.

In addition, the length of work machine modules 4A to 4I in the Y-direction is considerably reduced in relation to the length in the Z-direction. On the other hand, each of base units 2A to 2E has a length corresponding to the length of respective work machine modules 4A to 4I placed on top of the base units in X-direction. For example, the length of base unit 2A in the Y-direction is substantially the same as the length of one work machine module 4A in the Y-direction. In addition, the Y-direction dimension of each of base units 2B to 2E is substantially the same as the Y-direction dimension of two work machine modules, for example, work machine modules 4B, 4C. Therefore, the Y-direction dimension of base 3 is substantially the same as the combined dimension of nine work machine modules 4A to 4I arranged in the Y-direction. With the above configuration, machine tool device 1 of the present embodiment can have a relatively short length in the Y-direction even though nine work machine modules 4A to 4I are arranged in the Y-direction.

In addition, base units 2A to 2E of base 3 are fixed to each other and constitute one base. Normally, as described above, two of work machine modules 4B to 4I can be placed on each of base units 2B to 2E except base unit 2A. Each of four base units 2B to 2E is standardized, for example, and has the same shape, dimensions, and structure. As a result, the number of base units 2A to 2E constituting base 3 can be appropriately increased or decreased, and the number of work machine modules 4A to 4I to be arranged can also be freely changed accordingly. In the present embodiment, base 3 is constituted by multiple base units 2A to 2E, but base 3 may be constituted by a single unit without being divided into base units 2A to 2E.

Figure 2:
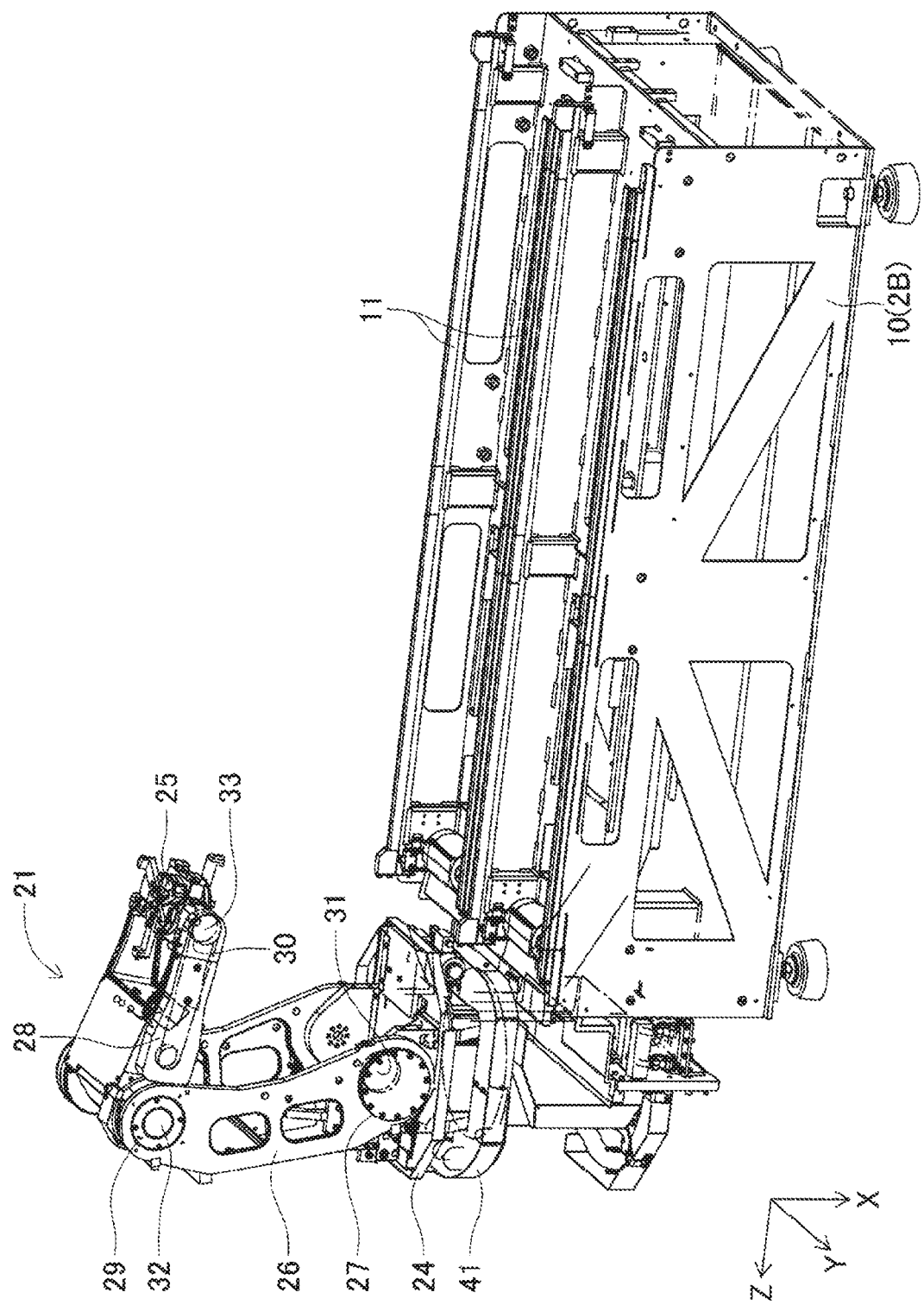
FIG. 2 A perspective view showing the structure of a base unit and a loader.

Next, the inner structure of base units 2A to 2E will be described. FIG. 2 is a perspective view showing the structure of base unit 2B and loader 21. Base units 2A to 2E have the same basic configuration, except that the number of work machine modules to be placed on base units 2A to 2E differs. Therefore, in the following description, base unit 2B will be mainly described, and the description of the other base units 2A, 2C to 2E will be omitted.

As shown in FIG. 2, base unit 2B includes a substantially rectangular parallelepiped-shaped main body 10 elongated in the Z-direction. The number of rails 11 corresponding to the number of work machine modules to be placed is provided on the upper section of main body 10. Two work machine modules 4B, 4C are placed on base unit 2B of the present embodiment, as shown in FIG. 1. For this reason, two pairs of rails 11 are arranged in the Y-direction in main body 10 of base unit 2B.

On the other hand, wheels (not shown) corresponding to rails 11 are provided on the faces of work machine modules 4B, 4C contacting base unit 2B. Each of the two work machine modules 4B, 4C is slidable in the Z-direction by moving the wheels on rails 11. As a result, the user can easily move each of work machine modules 4B, 4C in the Z-direction with respect to base unit 2B and pull out work machine modules 4B, 4C.

Further, work machine modules 4B, 4C can be moved to positions in which they can be detached from base unit 2B. As a result, a section of each of work machine modules 4A to 4I arranged on base 3 can be easily replaced or rearranged. Further, the exchanging operation of the expired tool described later can be performed while work machine modules 4A to 4I are pulled out.

Further, as shown in FIG. 1, controller 5 is disposed on the front wall of work machine modules 4B to 4H. Controller 5 includes liquid crystal display 89 (see FIG. 7) and operation section 91 (see FIG. 7) and displays the current operation state, current settings, and the like of machine tool device 1 on liquid crystal display 89 or receives various operations relating to machine tool device 1 via operation section 91.

Work content is determined for each of work machine modules 4A to 4I. For example, each of work machine modules 4A to 4I of the present embodiment may function as an entry module for inserting a workpiece into machine tool device 1, a lathe module for performing cutting, a drilling-milling module for performing drilling, milling, or the like with a drill, or an inspection module for inspecting a processed workpiece. Alternatively, each of work machine modules 4A to 4I of the present embodiment may function as a hob module for performing gear cutting, a temporary placement module for temporarily placing a workpiece, or an exit module for discharging a workpiece from the inside of machine tool device 1.

Which type of work machine module is disposed at a particular location with respect to base 3 depends on the type of operation to be performed on a workpiece. Further, the number of work machine modules arranged with respect to base 3 also differs depending on the work content of the corresponding workpiece. Further, with the exception of some work machine modules, the order in which the work machine modules are arranged can be changed in any manner in accordance with the type of operation.

For example, in the example shown in FIG. 1, the leftmost work machine module 4A of base 3 is an entry module for inserting a workpiece. The rightmost work machine module 4I is an exit module for discharging a workpiece. Work machine modules 4B to 4F are lathe modules, temporary placement modules, inspection modules, hob modules, or the like. Work machine modules 4G, 4H are drilling-milling modules. In machine tool device 1, operations are performed sequentially on the workpiece, inserted via the entry module positioned on the leftmost side, by each work machine module, starting from each of the work machine modules on the left side until the workpiece is finally discharged from the exit module.

Configuration of Loader 21

As shown in FIG. 2, machine tool device 1 of the present embodiment includes loader 21 as a conveyance unit for transferring a workpiece in the Y-direction. Loader 21 conveys and inverts a workpiece. In addition, loader 21 attaches the workpiece on spindle 51 of a lathe module (described later) (see FIG. 5) and removes the workpiece from spindle 51. The number of loaders 21 included in machine tool device 1 increases in proportion to the number of base units 2A to 2E, for example. One loader 21, for example, is disposed to handle two base units with two work machine modules placed on each base unit, or, in other words, a total of four work machine modules. For example, in the present embodiment, there are four base units 2B to 2E, if base unit 2A is excluded, on which entrance modules are placed, and therefore, two loaders 21 are disposed.

Figure 3:
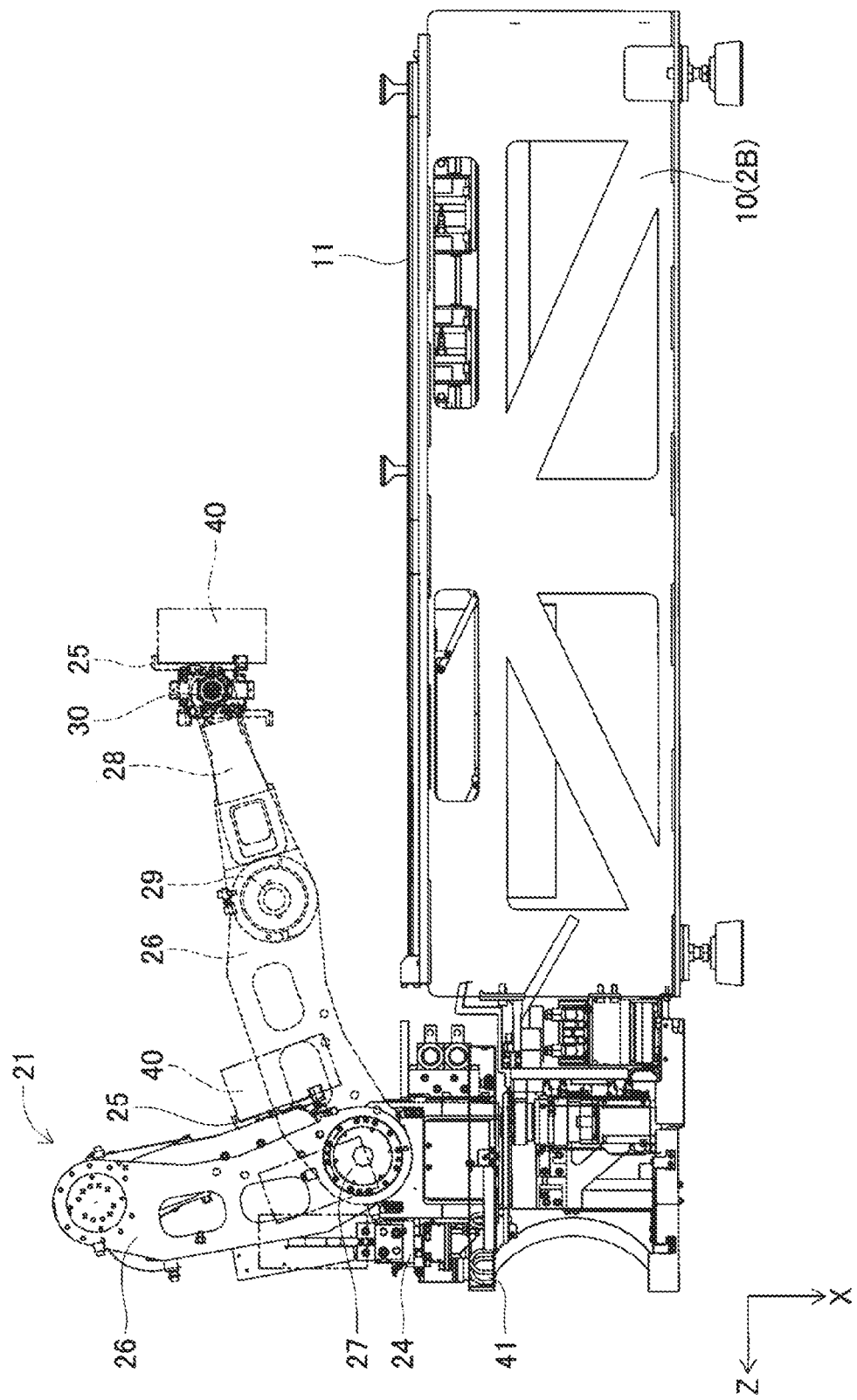
FIG. 3 A side view showing the structure of the base unit and the loader.

FIG. 3 is a side view showing the structure of base unit 2B and loader 21. As shown in FIGS. 2 and 3, loader 21 is disposed on table 24. Table 24 is disposed at substantially the same height as the upper face of base unit 2B (main body 10). Loader 21 is configured to move in the Y-direction, which is the arrangement direction of work machine modules 4A to 4I, together with table 24 along rails provided on the front face of main body 10, that is, the left face in FIG. 3. Loader 21 moves in the Y-direction in a work space provided between the front face of main body 10 and the outer wall (front face shown in FIG. 1) of machine tool device 1 (i.e., work machine modules 4B, 4C and base units 2B). Each of work machine modules 4A to 4I of the present embodiment is capable of opening and closing front panels 7 (see FIG. 1). Front panel 7 is configured to rotate, for example, from the lower side in the X-direction to the upper side. By rotating and opening front panel 7, the user can check loader 21 and exchange tool 77 positioned at tool exchanging position P1 (see FIG. 10) (described later).

Gripping section 25 for holding workpiece 40 (see FIG. 3) is provided at the distal end of loader 21. Loader 21 moves in the Y-direction while holding workpiece 40 with gripping section 25 and thus transfers workpiece 40 between work machine modules 4A to 4D.

Loader 21 of the present embodiment is a multi-joint robot having first arm 26 and second arm 28 and has multiple articulated sections that are capable of angular displacement. More specifically, loader 21 includes first joint 27 at a connecting section between table 24 and first arm 26, second joint 29 at a connecting section between first arm 26 and second arm 28, and third joint 30 at a connecting section between second arm 28 and gripping section 25.

Each joint is provided with a drive shaft. Each drive shaft includes, for example, a servomotor as a driving source. Specifically, first drive shaft 31 drives first joint 27 to displace the angle of first arm 26 with respect to table 24. Further, second drive shaft 32 drives second joint 29 to displace the angle of second arm 28 with respect to first arm 26. Further, third drive shaft 33 drives third joint 30 to displace the angle of gripping section 25 with respect to second arm 28.

Control device 81 (see FIG. 7) of work machine modules 4A to 4I can freely control the orientation of loader 21 by controlling first to third drive shafts 31 to 33. For example, control device 81 can bring first arm 26 and second arm 28 shown by solid lines in FIG. 3 into a folded state. Further, as shown by the broken line in FIG. 3, for example, by extending first arm 26 and second arm 28, control device 81 can attach workpiece 40, held by gripping section 25, to chuck 61 of spindle 51 (see FIG. 5) or detach workpiece 40 from spindle 51.

Further, loader rotation device 4I is provided below table 24. Loader rotation device 4I is capable of rotating table 24 about a rotation axis along the X-direction to rotate loader 21 disposed on table 24. Control device 81 can change the direction of the entire loader 21 by controlling loader rotation device 4I.

Configuration of Head Section 53 and Spindle 51

Figure 4:
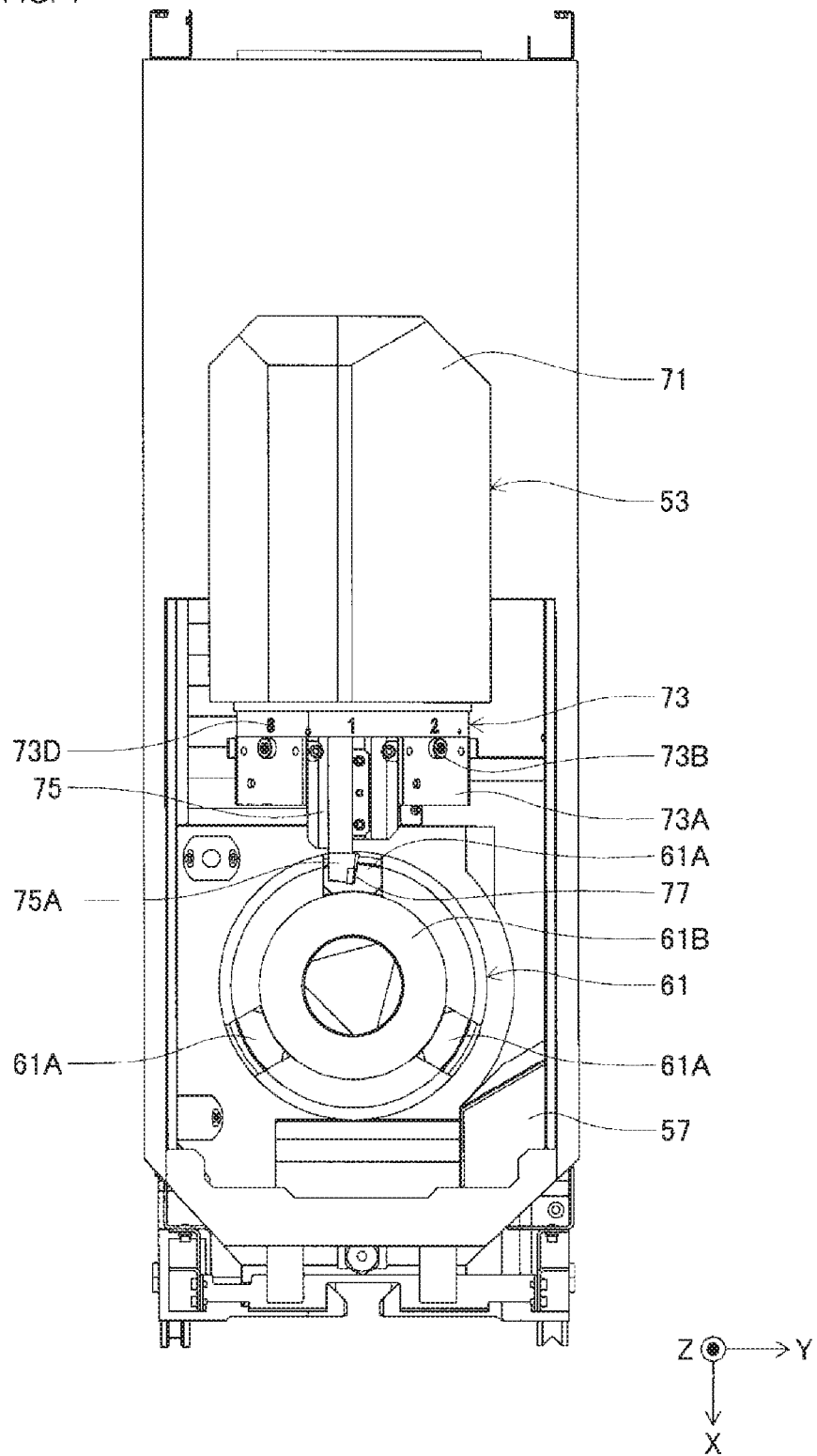
FIG. 4 A front view showing the internal structure of a work machine module.
Figure 5:
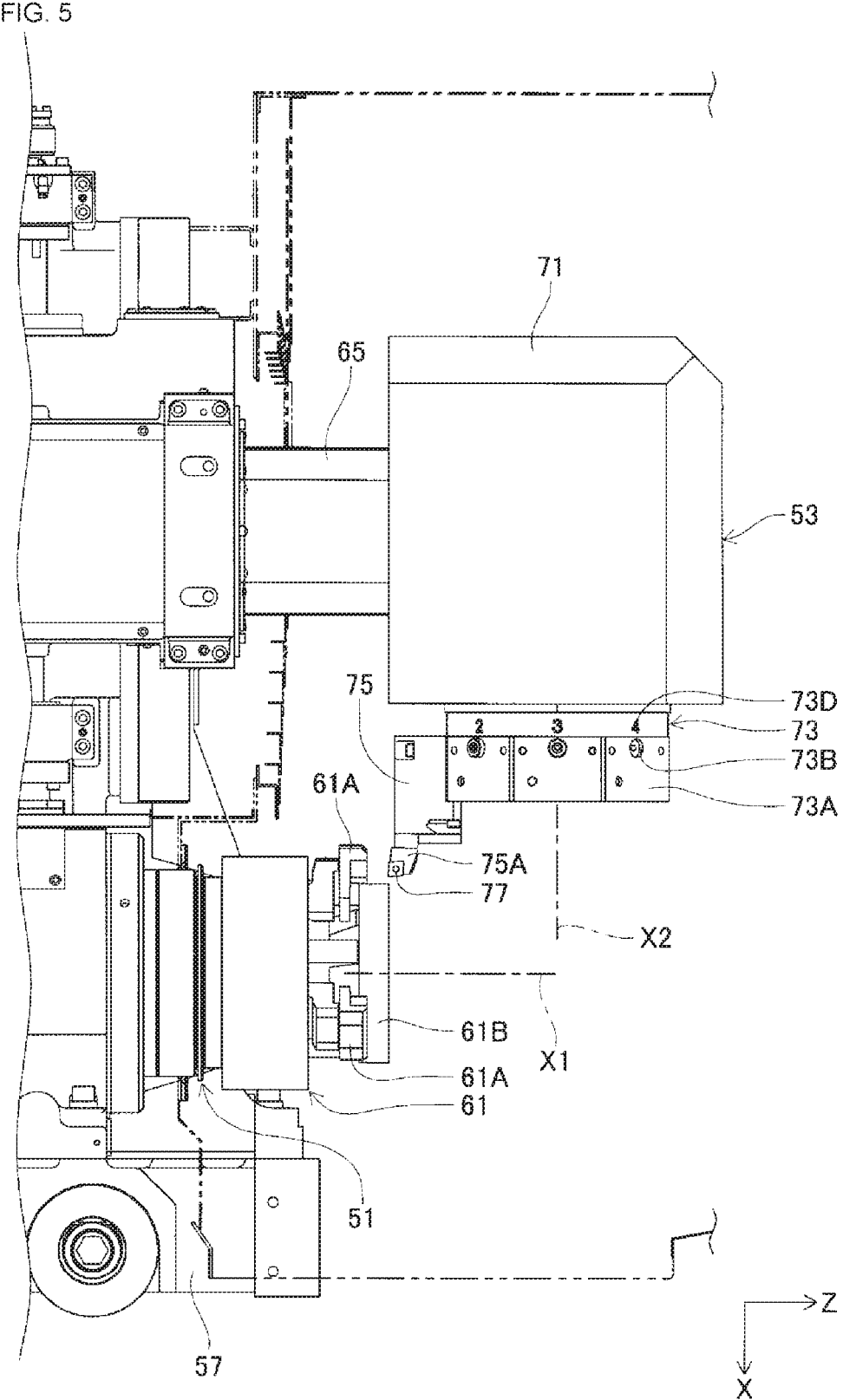
FIG. 5 A side view showing the internal structure of the work machine module.
Figure 6:
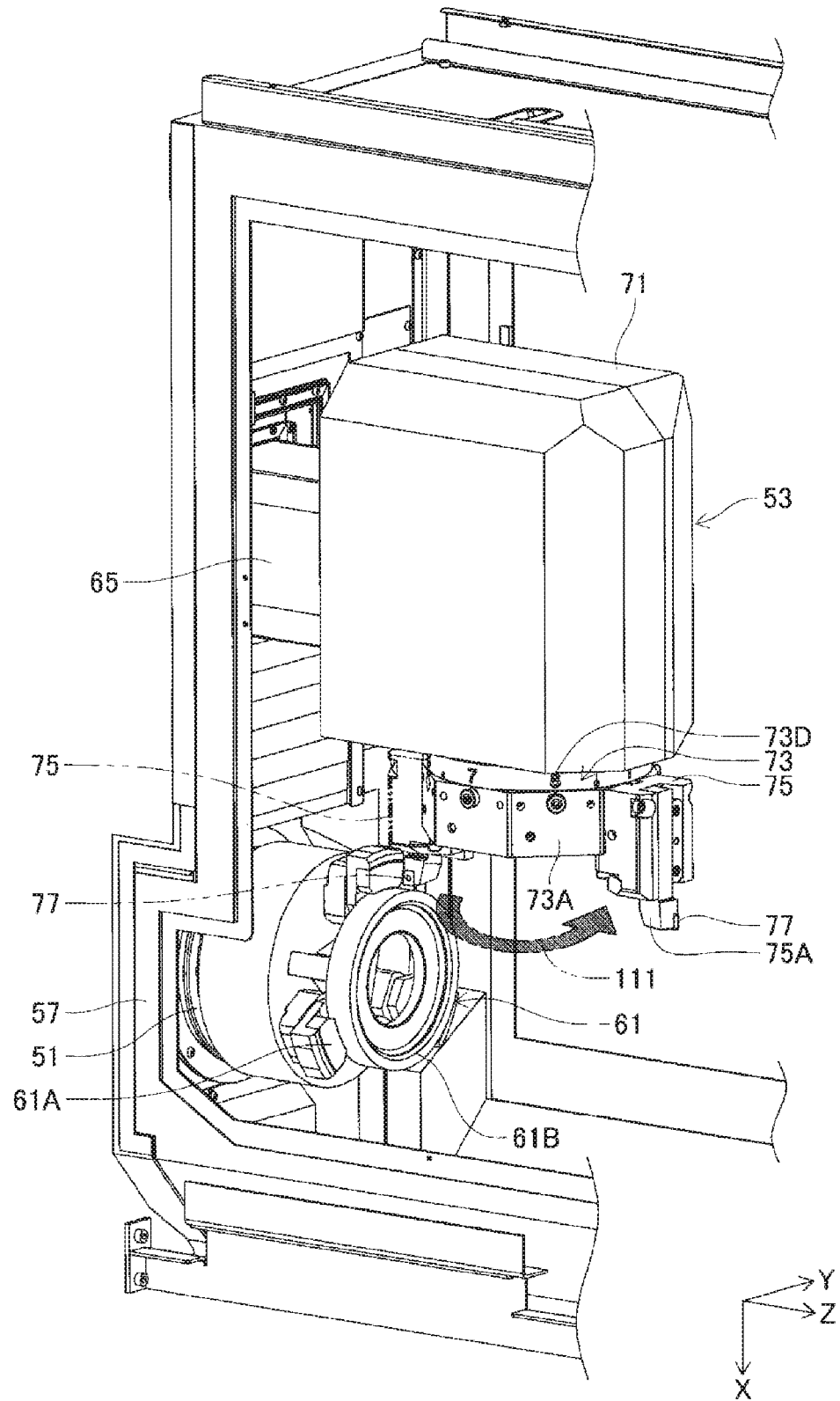
FIG. 6 A perspective view showing the internal structure of the work machine module.
Figure 7:
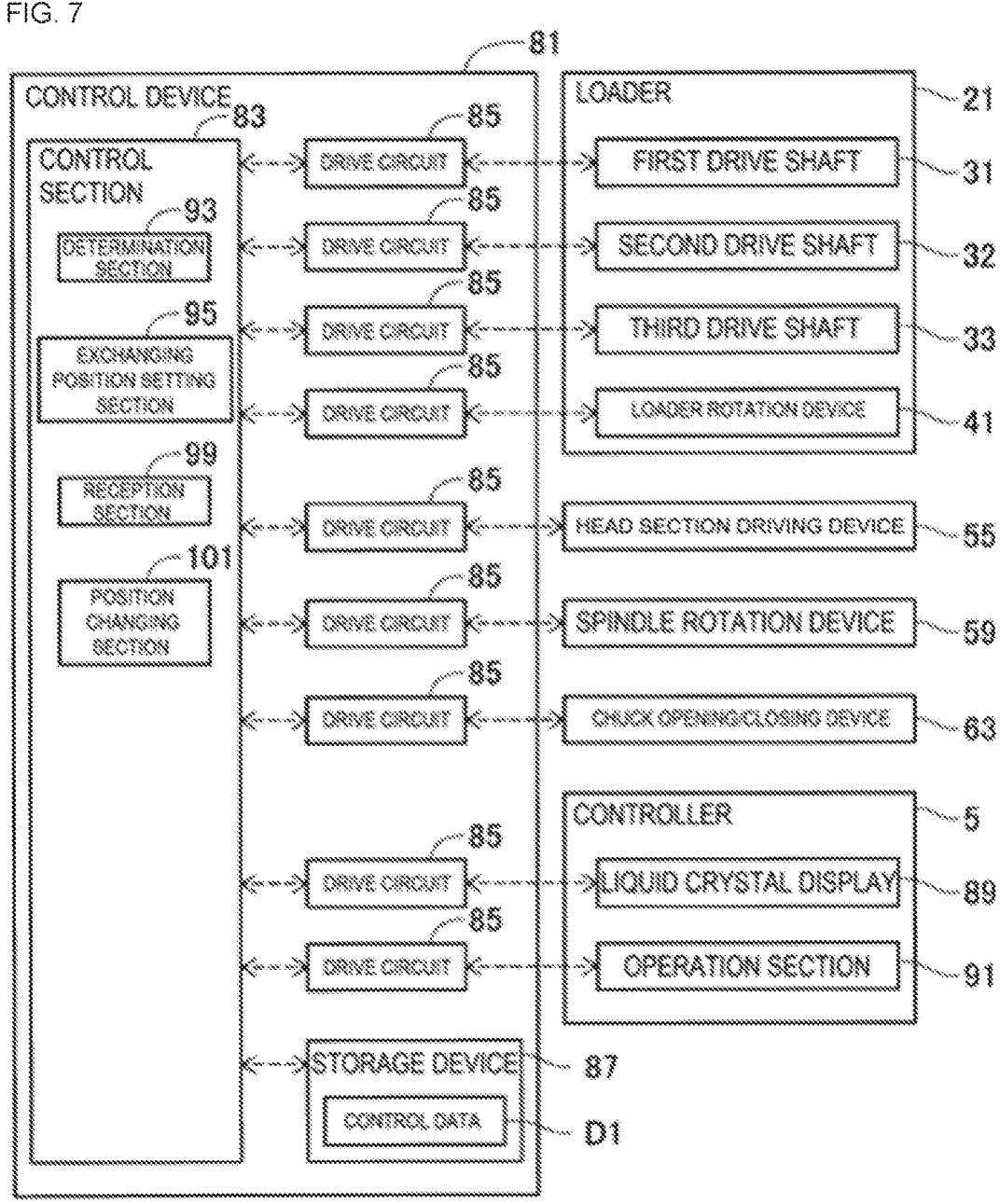
FIG. 7 A block diagram showing a control configuration of the work machine module.

As described above, each of work machine modules 4A to 4I of the present embodiment may be configured as a lathe module. In the following description, work machine module 4B is configured as a lathe module which is an embodiment of the machine tool of the present application. FIG. 4 is a front view showing the inner structure of work machine module 4B configured as a lathe module. FIG. 5 is a side view showing the inner structure of work machine module 4B. FIG. 6 is a perspective view showing the inner structure of work machine module 4B. FIG. 7 shows an example control configuration of work machine module 4B.

As shown in FIGS. 4 to 7, work machine module 4B includes spindle 51, head section 53, head section driving device 55, spindle rotation device 59, chuck opening/closing device 63, and the like. Spindle 51 is rotatably installed on base 57, which is attached to the main body of work machine module 4B. Spindle rotation device 59 is a device for rotating spindle 51. Spindle rotation device 59 includes, for example, a servomotor as a driving source. Spindle rotation device 59 rotates spindle 51 about first rotation axis X1 along the Z-direction shown in FIG. 5 in accordance with the driving of the servomotor. First rotational axis X1 of spindle 51 of the present embodiment is an axis along the Z-direction (an example axial direction) which is a direction parallel to installation surface 9 (see FIG. 1), on which work machine module 4B (machine tool device 1) is installed. Note that, spindle 51 is not limited to a configuration of rotating about first rotation axis X1 along the Z-direction and may be configured to rotate about, for example, a rotation axis along the X-direction (i.e., a direction perpendicular to installation surface 9).

Chuck 61 is attached to the distal end of spindle 51 (i.e., the right end section in FIG. 5). Chuck 61 includes multiple (three in this embodiment) chuck claws 61A and seat 61B to which workpiece 40 (see FIG. 3) is attached. Three chuck claws 61A are disposed so as to surround the periphery of the disk-shaped base 61B. Chuck claws 61A are arranged, for example, at equal intervals in the circumferential direction of seat 61B.

As described above, loader 21 assumes the extended state shown by a broken line in FIG. 3, and workpiece 40 held by gripping section 25 is mounted in seat 61B of chuck 61. Three chuck claws 61A move toward the center of seat 61B, that is, toward rotation center of spindle 51, in response to the driving by chuck opening/closing device 63 (see FIG. 7). Chuck opening/closing device 63 includes, for example, a servomotor as a driving source, an actuator for moving chuck claws 61A, and the like. Control device 81 causes loader 21 to mount workpiece 40 on seat 61B, and then causes chuck opening/closing device 63 to move chuck claws 61A. Workpiece 40 is secured by seat 61B and three chuck claws 61A. Workpiece 40 rotates around first rotation axis X1 in accordance with the rotation of spindle 51.

Head section 53 includes head main body 71 and turret 73. Head section 53 is disposed above spindle 51 in the X-direction. Head main body 71 is substantially box-shaped and is attached to the distal end of moving mechanism 65. Head section driving device 55 includes, for example, a servomotor and the like built in base 57. Moving mechanism 65 is held at the base end by base 57, and expands and contracts in the Z-direction in accordance with the driving by head section driving device 55. As a result, head main body 71 moves to any position along the Z-direction in accordance with the expansion and contraction of moving mechanism 65. Further, moving mechanism 65 slides in the X-direction in accordance with the driving by head section driving device 55. As a result, head main body 71 moves to any position in the X-direction in accordance with the sliding movement of moving mechanism 65. That is, head section 53 of the present embodiment is configured to move in two directions, the X-direction and the Z-direction. Head section 53 may be configured to move in only one direction, or may be configured to move in three directions (X-direction, Y-direction, and Z-direction).

Turret 73 is attached to the lower face of substantially box-shaped head main body 71. Turret 73 has a thick plate shape in the X-direction (i.e., the up-down direction). Turret 73 is formed with attachment surfaces 73A for attaching holder 75 on the outer peripheral surface. In turret 73 of the present embodiment, for example, eight attachment surfaces 73A are formed on the outer peripheral surface, and holder 75 can be attached to any of attachment surfaces 73A. Turret 73 has a regular octagon shape when viewed from the X-direction. Thus, turret 73 of the present embodiment has a regular octagon plate shape that is thick in the X-direction.

Head section driving device 55 is a device for rotating turret 73 and includes, for example, a servomotor incorporated in head section 53, an output shaft to which turret 73 is attached and which rotates in accordance with the driving of the servomotor, or the like. Turret 73 rotates about second rotation axis X2 along the X-direction in response to driving by head driving device 55. Second rotation axis X2 of the present embodiment is an axis along the direction (i.e., the X-direction) orthogonal to first rotation axis X1 of spindle 51.

Holder attachment section 73B for attaching holder 75 is provided on each of the eight attachment surfaces 73A. For example, a screw groove for screwing a bolt inserted into holder 75 is formed in holder attachment section 73B. Thus, holder 75 can be attached to and detached from turret 73 by tightening the bolts. Note that, FIGS. 4 to 6 show, as an example, a state in which only one holder 75 is attached to turret 73.

Further, each of attachment surfaces 73A is provided with numerals 1 to 8 (turret number 73D) for distinguishing attachment surfaces 73A (i.e., holders 75) from each other. Thus, the user can identify holder 75 or tool 77 attached to holder 75 by checking turret number 73D. FIG. 4 shows a state in which turret number 73D "No. 1" is positioned on the near side. Further, FIG. 5 shows a state in which turret number 73D "No. 1" is positioned on the chuck 61 side.

Holder 75 is provided with tool attachment section 75A for attaching tool 77. Tool 77 is, for example, a cutting tool, and is used for cutting workpiece 40. Tool 77 is fixed to tool attachment section 75A by, for example, tightening of a screw. Head section 53 changes tool 77 for cutting or the like by rotating turret 73 and changing tool 77 which comes near chuck 61 in the Z-direction, that is, tool 77 facing workpiece 40 fixed in chuck 61. Note that, tool 77 of the present application is not limited to a blade, and may be a drill or the like.

Work machine module 4B of the present embodiment then performs a cutting process or the like on workpiece 40, fixed in chuck claws 61A and seat 61B, with tool 77 under the control of control device 81. Work machine module 4B rotates turret 73 and disposes tool 77, which is to be used, toward workpiece 40, that is, toward chuck 61. Work machine module 4B performs the cutting process or the like by rotating spindle 51 and thus rotating workpiece 40 fixed in chuck 61 while applying tool 77, fixed to holder 75, to workpiece 40.

Configuration of Control Device 81

As shown in FIG. 7, control device 81 includes control section 83, multiple drive circuits 85, and storage device 87. Control section 83, having a CPU, ROM, RAM, and the like, mainly consists of a computer, and is connected to multiple drive circuits 85. The multiple drive circuits 85 are connected to controller 5, first to third drive shafts 31 to 33, loader rotation device 4I, head section driving device 55, spindle rotation device 59, and chuck opening/closing device 63. Drive circuit 85 includes an amplifier or the like for changing the power supplied to the servomotor. Thus, control section 83 can control the operation of first to third drive shafts 31 to 33, head section driving device 55, and the like via drive circuits 85. Note that, as described above, loader 21 may be shared among multiple work machine modules 4A to 4I. In this case, for example, any one of the multiple work machine modules 4A to 4I may control loader 21, or the control device of machine tool device 1 may control loader 21 in an integrated manner.

Storage device 87 includes, for example, a hard disk, a memory, and the like. Control section 83 of the present embodiment reads control data D1 stored in storage device 87 and executes various types of work, such as cutting, on workpiece 40. As control data D1, for example, data such as programs for controlling the normal operation of work machine module 4B, the type of workpiece 40 to be produced, the type of tool 77 to be used for the work, the position of tool 77 with respect to workpiece 40 during the work, and the like are set. The program referred to herein may be, for example, a sequence control program (ladder circuit) or an NC program. Position information of tool exchanging position P1 (see FIG. 10) for exchanging tool 77 (hereinafter, sometimes referred to as an expired tool) that needs to be exchanged due to elapse of usable time, breakage, or the like described later is set in control data D1 of the present embodiment. Control device 81 sets the initial position of tool exchanging position P1 based on position information of tool exchanging position P1. In the following description, control section 83 of control device 81 is sometimes simply referred to as a "device", which executes control data D1 to control each device. For example, "head section 53 moves" means that "control device 81 controls the operation of head section driving device 55 by executing control data D1 with control section 83 and moves head section 53 by controlling the operation of head section driving device 55".

As described above, work machine module 4B is provided with controller 5 for receiving user operations and displaying data. Controller 5 includes liquid crystal display 89 for displaying the current operation state, current settings, and the like of work machine module 4B, and operation section 91 for receiving operations from the user. Operation section 91 may be configured with hard buttons, a touch panel disposed on the front face of liquid crystal display 89, or both. The display screen of liquid crystal display 89 is controlled by control section 83. The user checks the display content of liquid crystal display 89 and performs various operations on work machine module 4B by operating operation section 91. Controller 5 of the present embodiment is used, for example, when tool exchanging position P1 of work machine module 4B is changed to an arbitrary position as described later.

Operation for Exchanging Tool 77

Figure 8:
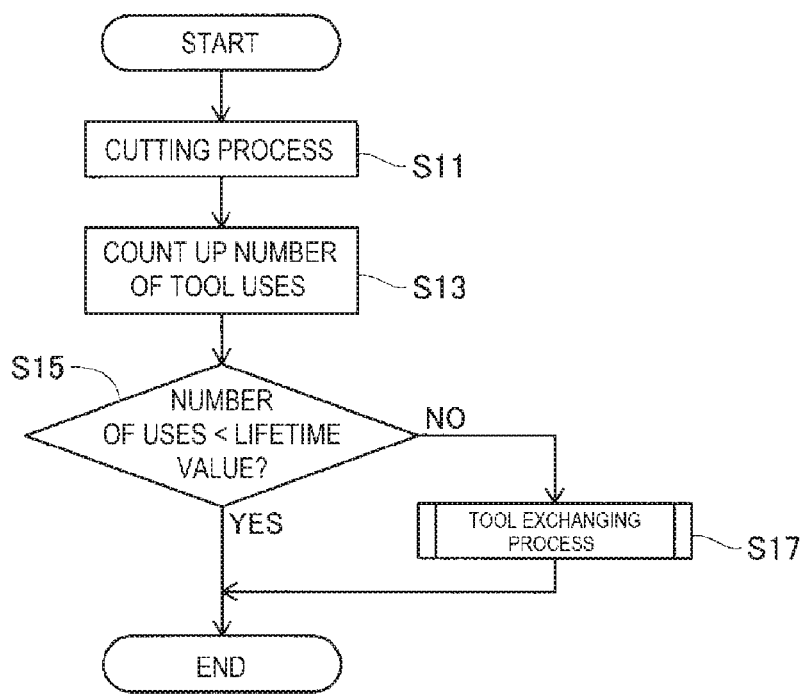
FIG. 8 A flowchart showing the processing procedure of a cutting process.

Next, an operation for exchanging the expired tool executed by control device 81 in work machine module 4B of the present embodiment having the above configuration will be described with reference to FIGS. 8 and 9. In the following description, the operation of exchanging tool 77 used for cutting work will serve as an example of an operation of exchanging the expired tool. FIG. 8 is a flowchart showing a processing procedure of a cutting process. FIG. 9 is a flowchart showing a processing procedure of a tool exchanging process.

Machine tool device 1 including workpiece machine module 4B starts various types of operations on workpiece 40 by, for example, executing predetermined operations from a user. Control device 81 of work machine module 4B starts the cutting process in step (hereinafter, abbreviated as S) 11 of FIG. 8. Control device 81 receives workpiece 40 via loader 21 from upstream work station module 4A and attaches workpiece 40 to chuck 61. Control device 81, for example, rotates turret 73, and performs a cutting process on workpiece 40 while switching tool 77 to be used. When the cutting process is completed, control device 81 discharges the processed workpiece 40 downstream to work machine module 4C via loader 21.

Next, control device 81 counts up the number of times all of tools 77 were used for the cutting process (S13). In S15, control device 81 then determines whether the number of times each of tools 77 was used is smaller than a preset lifetime value. Thus, each time the cutting process is completed, control device 81 counts up the number of times all tools 77 were used in the cutting process. Then, it is determined whether there is tool 77 whose number of uses exceeds the lifetime value, that is, whether a lifetime tool is present. This lifetime value is, for example, the number of times tool 77 can be used based on the material, shape, and the like.

The time at which the presence of an expired tool is determined is not limited to the time at which the cutting process is finished. For example, control device 81 may determine whether used tool 77 is an expired tool at the time at which turret 73 is rotated and tool 77 to be used is switched during cutting. The method for determining whether a tool is an expired tool is not limited to the number of uses. For example, control device 81 may determine whether a tool is an expired tool based on length of time of using tool 77. Further, control device 81 may designate tool 77 which has been broken or the like as an expired tool. For example, control device 81 may detect a breakage of tool 77 based on a change in torque acting on holder 75 or chuck 61 during the cutting process, and thus determine broken tool 77 as an expired tool. Further, without determining whether all of the tools 77 attached to turret 73 are expired tools in S15, control device 81 may determine whether only the tool 77 used in S13 is an expired tool, that is, tool 77 used in the immediately preceding cutting process. As a result, the processing load of the determination process in S15 can be reduced.

In S15, control device 81 ends the process shown in FIG. 8 in response to the number of times each of all tools 77 were used being smaller than the lifetime value (S15: YES). In this case, control device 81 is in a standby state until a new workpiece 40 is conveyed in or the like occurs. Control device 81 then executes the detection of expired tools shown in FIGS. 8 and 9 in the same manner after the next cutting process.

Here, control device 81 of the present embodiment can set whether to perform normal management or group management for multiple tools 77. Control device 81 switches between normal management and group management based on, for example, operation input to operation section 91 of controller 5. Here, normal management is a method of individually managing the number of times each of tools 77 attached to turret 73 is used. When normal management is set, in S15, control device 81 determines whether the number of times each of tools 77 is used is equal to or greater than the lifetime value, that is, whether the tool is an expired tool. When any one of the multiple tools 77 is an expired tool (S15: NO), control device 81 starts a tool exchanging process (S17).

On the other hand, group management is a method of managing multiple tools 77 attached to turret 73 as a group. One group includes, for example, two or more tools 77 among the multiple tools 77 attached to turret 73. In the case in which group management is set as the management method, control device 81 determines that "an expired tool" is present and starts the tool exchanging process (S17) when all of the multiple tools 77 belonging to one group become expired tools in S15 (S15: NO).

As a result, multiple tools 77 of the same type, for example, become attached to turret 73. This same type of tool 77 is a tool 77 that is frequently used or has a short usable period. If the same type of tool 77 is set as one group and the exchanging operation is performed when all of tools 77 in the group are expired tools, multiple expired tools can be collectively exchanged to improve the efficiency of the exchanging operation. Further, the cutting process can continue using tool 77 as long as even just one tool 77 within the same group has not reached the time to be exchanged (S15: YES). In other words, it is possible to shorten the stop time of the production line associated with the exchanging operation, thereby improving the production efficiency. In the group management described above, the multiple tools 77 attached to turret 73 may be divided into two or more groups. Further, among the multiple tools 77 attached to turret 73, tools 77 not belonging to the group may be present.

In S15, control device 81 determines the presence of an expired tool in accordance with the above-described normal management or group management, and if an expired tool is present (S15: NO), control device 81 starts the tool exchanging process shown in FIG. 9 (S17). In S21 of FIG. 9, control device 81 determines whether normal management or group management is set as the management method for tool 77.

When normal management is set (S21: YES) as the management method, control device 81 designates the expired tool having the lowest turret number 73D as the exchange target tool 77 (S23). For example, when one tool 77 is an expired tool, that tool 77 is designated as the exchange target. When it is determined in S15 that multiple tools 77 are expired tools, the expired tool having a small turret number 73D, to which tool 77 is attached, is preferentially designated as exchange target tool 77. As a result, when multiple expired tools are present, exchange target tool 77 can be determined in the same way for all tools 77. In step S25, control device 81 disposes exchange target tool 77 determined in step S23 at the tool exchanging position. The method of designating the exchange target is not limited to the above-described method. For example, tool 77 having the largest turret number 73D, among the multiple expired tools, may be designated as the exchange target. Alternatively, tool 77 closest to the tool exchanging position among the multiple expired tools may be designated as the exchange target.

On the other hand, in S21, when normal management is not set, that is, when group management is set (S21: NO) as the management method, control device 81 designates the expired tool having the lowest turret number 73D or the including that expired tool as the exchange target tool 77 (S27). For example, if the expired tool having the smallest turret number 73D among the multiple expired tools is a tool 77 that does not belong to the group, that expired tool is designated as the exchange target tool 77. Further, for example, if the expired tool having the smallest turret number 73D is a tool 77 belonging to the group, that expired tool is designated as the exchange target tool 77 and the next exchange target is determined from within that group in S35 described later. As a result, even in the case of group management, the exchange target tool 77 can be determined in the same way for all tools 77. In step S25, control device 81 disposes tool 77 at the tool exchanging position, tool 77 having been designated an exchange target in step S27.

In S25, control device 81 disposes the expired tool at a tool exchanging position, which is a position where the expired tool and new tool 77 are to be exchanged. Control device 81 controls head section driving device 55 in accordance with the tool exchanging position and rotates turret 73 while moving head section 53 to position the expired tool at the tool exchanging position. For example, in response to the presence of the expired tool, control device 81 outputs a signal, indicating the arrival of the expired tool, to the ladder circuit described above. The ladder circuit reads out the NC program, needed to drive head section driving device 55, from control data D1 in response to receiving a signal and causes the CPU or the like of control section 83 to execute the NC program.

As an example, a case of exchanging tool 77 of turret number 73D "No. 1" will be described. In this case, the ladder circuit reads out the NC program for exchanging turret number 73D "No. 1" from control data D1. As shown in FIG. 6, tool 77 of turret number 73D "No. 1", for example, is used in the cutting process before the tool exchanging process is started and is disposed on the chuck 61 side (i.e., the position indicated by the two-dot chain line in FIG. 6). In this case, control device 81 rotates turret 73 by 180 degrees, for example, and disposes "No. 1" tool 77 at the front side in the Z-direction (see arrow 111 in FIG. 6).

FIG. 10 shows a state in which "No. 1" tool 77 is moved to tool exchanging position P1 after turret 73 is rotated. As shown in FIG. 10, tool exchanging position P1 is, for example, a position in which tool 77 in an operating position is rotated 180 degrees (the position indicated by the solid line in FIG. 10), moved to the front of the device (i.e., the controller 5 side) along the Z-direction, and then moved downward along the X-direction (i.e., the position indicated by the two-dot chain line in FIG. 10).

Therefore, in the present embodiment, as described above, first rotation axis X1 of spindle 51 is an axis along the Z-direction, which is a direction parallel to installation surface 9 of machine tool device 1 (see FIG. 1). Head section driving device 55 is configured to move head section 53 along the Z-direction. Tool exchanging position P1 is set at a position along the Z-direction but spaced apart from spindle 51. With this configuration, the direction of first rotation axis X1 of spindle 51 and the moving direction of head section 53 are aligned in the same direction (i.e., the Z-direction), thereby making it possible to miniaturize work machine module 4B (machine tool device 1). In other words, work machine module 4B of the present embodiment can reduce the size of the device by reducing the Y-direction width of the device.

After rotating turret 73 by 180 degrees (see arrow 111 in FIG. 10), control device 81 moves head section 53 along the Z-direction away from spindle 51 (see arrow 113 in FIG. 10). Next, control device 81 lowers head section 53 in order to position "No. 1" tool 77, that is, the expired tool, at tool exchanging position P1 (see arrow 115 in FIG. 10). Note that, when moving head section 53 to tool exchanging position P1, control device 81 moves head section 53 after rotating turret 73, but the present disclosure is not limited thereto. Control device 81 may rotate turret 73 (arrow 111) after moving head section 53 (arrows 113, 115). Alternatively, control device 81 may move head section 53 while rotating turret 73 to dispose the expired tool at tool exchanging position P1.

Returning to FIG. 9, in step S29, after executing step S25 and disposing the expired tool at tool exchanging position P1, control device 81 displays turret number 73D of the expired tool disposed at tool exchanging position P1 on liquid crystal display 89 of controller 5. Further, control device 81 causes liquid crystal display 89 to display buttons (e.g., an OK button) for receiving an indication as to whether the exchanging of tool 77 has been completed. Control device 81 may notify the user of the position of the module where an expired tool has been detected by turning on a lamp of work machine module 4B or by sounding a buzzer.

When an expired tool is detected in the conventional machine tool, the user operates controller 5, for example, and manually moves head section 53 and rotates turret 73 to dispose exchange target tool 77 at tool exchanging position P1. That is, in order to exchange the expired tool, an operation of moving tool 77 to tool exchanging position P1 is necessary. On the other hand, in work machine module 4B of the present embodiment, in response to detecting an expired tool, the expired tool is automatically disposed at tool exchanging position P1. The user checks the lighting of lamps and the like, moves to the front of the work machine module 4B, and then opens front panel 7 of work machine module 4B (see FIG. 1). At this point, the expired tool is disposed at tool exchanging position P1. The user removes the expired tool from holder 75 and attaches new tool 77 to holder 75. As a result, the efficiency of the exchanging operation is improved. When a door, such as a shutter, is disposed between chuck 61 and front panel 7 in the Z-direction, for example, control device 81 may automatically open and close the door.

After displaying the OK button on liquid crystal display 89 in S29 of FIG. 9, control device 81 determines whether the OK button has been pressed (S31). That is, control device 81 determines whether there has been an operation input indicating that the exchanging of tool 77 has been completed. Control device 81 repeatedly executes the determination of S31 until the OK button is pressed (S31: NO).

After exchanging tool 77, the user touches the OK button displayed on liquid crystal display 89. In response to pressing of the OK button (S31: YES), control device 81 determines whether there is a pre-exchange (i.e., yet to be exchanged) expired tool that has not yet been exchanged, that is, whether there is another tool 77 that needs to be exchanged (S33).

When there is no pre-exchange expired tool (S33: YES), control device 81 ends the process shown in FIGS. 8 and 9. Control device 81 is in a standby state until a new workpiece 40 is conveyed in or the like. Control device 81 then similarly performs the detection of an expired tool shown in FIGS. 8 and 9 and the like after the next cutting process.

On the other hand, when a pre-exchange expired tool is present (S33: NO), control device 81 designates tool 77 that is to be exchanged next (S35), similarly to S23 and S27 described above. For example, in the case of normal management, control device 81 designates an expired tool having a smaller turret number 73D among the expired tools that have not been exchanged as the exchange target tool 77 (S35). Further, for example, in the case of group management, control device 81 designates tool 77 having the next smallest turret number 73D among tools 77 (i.e., expired tools) belonging to the same group as previously exchanged tool 77 as the exchange target tool 77 (S35). Further, for example, in the case of group management, if there is no pre-exchange expired tool in the group, control device 81 designates tool 77 belonging to another group or not belonging to any group having the smallest turret number 73D as exchange target tool 77. After determining the next exchange target tool 77, control device 81 starts the process of S25 and subsequent steps. For example, in S25, control device 81 rotates turret 73 to dispose the next exchange target tool 77 at tool exchanging position P1.

As described above, in the case of group management, control device 81 of the present embodiment receives an indication that the expired tool disposed at tool exchanging position P1 has been exchanged with a new tool 77 among the multiple tools 77 (i.e., expired tools) belonging to the group (S31). Then, in response to receiving an indication that the exchange (S31: YES) has been performed, control device 81 rotates turret 73 and disposes pre-exchange (i.e., yet to be exchanged) tool 77 (i.e., expired tool), among the tools 77 belonging to the group, at tool exchanging position P1 (previously executed S25 again).

With this configuration, when control device 81 receives an indication from the user that the exchange has been performed, another expired tool belonging to the group is disposed at tool exchanging position P1. As a result, the user can sequentially position and exchange the expired tools in the group at tool exchanging position P1 by performing the reception operation every time expired tools in the group are replaced. In this way, it is possible to improve the efficiency of the exchanging operation.

Note that control device 81 may receive a change in tool exchanging position P1. As described above, the position information of tool exchanging position P1 is set in control data D1 of this embodiment. Control device 81 may change the position information of tool exchanging position P1 based on, for example, operation input to operation section 91 of controller 5. For example, when the user accepts the change of tool exchanging position P1 on operation section 91, control device 81 stores the X-direction coordinate position and the Z-direction coordinate position after the change in control data D1 as new position information for tool exchanging position P1. Then, in response to the detection of an expired tool, control device 81 performs control based on the changed tool exchanging position P1 and disposes the expired tool at tool exchanging position P1.

Therefore, control device 81 of the present embodiment changes tool exchanging position P1 in response to receiving the change of tool exchanging position P1 by operation section 91. In accordance with the change of tool exchanging position P1, control device 81 controls head section driving device 55 with reference to the changed tool exchanging position P1. As a result, the user can set tool exchanging position P1 to any position by changing the position of tool exchanging position P1 in the X-direction (i.e., the up-down position) or the position in the Z-direction (i.e., the front-rear position). For this reason, for example, tool exchanging position P1 desired by the user can be set according to the height of the user, the height of machine tool device 1, the positioning of work machine module 4B, and the like. As a result, by setting the optimum tool exchanging position P1 at the operation site, it is possible to improve the efficiency of the exchanging operation.

Further, it is preferable that tool exchanging position P1 is set at a position within the movable range of head section 53. To this end, in the case in which tool exchanging position P1 is received from the user, control device 81 may send out an error notification upon detecting a position set outside the movable range of head section 53. For example, control device 81 may display that an incorrect position is set on controller 5.

As shown in FIG. 7, control section 83 of control device 81 includes determination section 93, exchanging position setting section 95, reception section 99, and position changing section 101. Determination section 93 and the like are, for example, processing modules that are created by executing control data D1 (programs and the like) in the CPU of control section 83. Determination section 93 and the like may be configured not by software but by hardware.

Determination section 93 is a functional section for determining whether there is tool 77 that needs to be exchanged (i.e., an expired tool) among tools 77 held by turret 73. Exchanging position setting section 95 is a functional section that sets tool exchanging position P1 based on control data D1. Reception section 99 is a functional unit that receives an indication that the expired tool among the multiple tools 77 belonging to the group located at tool exchanging position P1 has been exchanged with a new tool 77. Position changing section 101 is a functional section that changes tool exchanging position P1 in response to the acceptance of the change of tool exchanging position P1 by operation section 91.

Note that, in the above embodiment, work machine modules 4A to 4I are examples of machine tools. The Z-direction is an example of an axial direction.

As described above, in the present embodiment, the following effects are obtained. When it is determined that an expired tool is present (S15: NO), control device 81 of the present embodiment causes head driving section 55 to move head section 53 and rotate turret 73 to position the expired tool at tool exchanging position P1. As a result, even if turret 73 is rotated in accordance with tool 77 used in the cutting process and the rotational position of the expired tool is changed, when tool 77 is exchanged, the expired tool can be automatically moved to predetermined tool exchanging position P1. The user does not need to move head section 53 or rotate turret 73 prior to exchanging the expired tool and can perform the exchanging operation just by exchanging the expired tool disposed at tool exchanging position P1. As a result, it is possible to improve the efficiency of exchanging tool 77 and, thus, also the production efficiency.

It should be noted that the present application is not limited to the above-mentioned embodiments, and various modifications and variations can be made without departing from the gist of the present application. For example, control device 81 may be configured to perform only one of normal management and group management. Further, control device 81 receives an indication as to whether the expired tool disposed at tool exchanging position P1 has been exchanged with new tool 77, but the present disclosure is not limited thereto. Control device 81 may have a configuration which does not receive an indication as to whether the expired tool has been exchanged. For example, control device 81 may send out a notification that turret 73 will be rotated to change tool 77 at tool exchanging position P1 when a predetermined time has elapsed since the expired tool was placed at tool exchanging position P1. The user may confirm this notification and, for example, may stop the exchanging of turret 73 and continue the exchanging operation if tool 77 has not been exchanged. Further, control device 81 may be configured so that tool exchanging position P1 cannot be changed. In the above embodiment, machine tool device 1 is configured to include multiple work machine modules 4A to 4I, but the present disclosure is not limited thereto, and may be configured to include only work machine module 4B.

Further, the shape of workpiece 40 shown in FIG. 3 is an example and may be changed as appropriate. Further, first rotation axis X1 is an axis along the Z-direction, but the present disclosure is not limited thereto. For example, first rotation axis X1 may be an axis along a direction that forms a predetermined angle with the Z-direction. Further, in the above embodiment, second rotation axis X2 of turret 73 is an axis along the direction (i.e., the X-direction) orthogonal to first rotation axis X1 of the spindle 51, but the present disclosure is not limited thereto. Second rotation axis X2 may be an axis along a direction that forms a predetermined angle with first rotation axis X1 (that is, a direction that intersects first rotation axis X1).

REFERENCE SIGNS LIST 4A to 4I: work machine module (machine tool); 9: installation surface; 40: workpiece; 51: spindle; 53: head section; 55: head section driving device; 73: turret; 77: tool; 81: control device; 93: determination section; 95: exchanging position setting section; 99: reception section; 101: position changing section; P1: tool exchanging position; X1: first rotation axis; X2: second rotation axis

The invention claimed is:
1. A machine tool, comprising:
a spindle configured to hold a workpiece and rotate about a first rotation axis;
a head section disposed above the spindle and configured to perform an operation on the workpiece with a tool;
a head section driving device for driving the head section;
a front panel, the front panel being configured to rotate from a lower side to an upper side in a vertical direction of the machine tool;
a display device; and
a control device,
wherein the head section has a turret, being configured to hold the tool held at the outer periphery of the turret, which is rotatable about a second rotation axis along a direction orthogonal to the first rotation axis,
wherein the first rotation axis extends in a front-rear direction of the machine tool, and
wherein the control device is configured to:
determine whether an expired tool, which is a tool that needs to be exchanged, is present among multiple tools held by the turret,
set a tool exchanging position, which is a position within a movable range of the head section and is a position at which a user exchanges the expired tool with a new tool, the tool exchanging position being located closer to the front panel than the spindle is in the front-rear direction of the machine tool, and
when the control device determines that the expired tool is present, control the head section driving device to automatically move the head section parallel to at least one of the first rotation axis and the second rotation axis and rotate the turret to dispose the expired tool at the tool exchanging position, and display on the display device both a turret number of the expired tool disposed at the tool exchanging position and a button for receiving an indication that exchanging of the expired tool with the new tool has been completed.

2. The machine tool of claim 1, wherein
the control device is configured to process the multiple tools held by the turret as one group and determines that the expired tool is present when all of the multiple tools belonging to the group become expired tools, the expired tools including a first expired tool and a second expired tool.

3. The machine tool of claim 2,
wherein the control device is further configured to:
receive the indication that the first expired tool, being positioned at the tool exchanging position, among the multiple tools belonging to the group has been exchanged with the new tool, and
rotate the turret in response to receiving the indication that the expired tool has been exchanged, so as to position the second expired tool, which is among the multiple tools belonging to the group and is to be exchanged, at the tool exchanging position.

4. The machine tool of claim 1,
wherein the control device is further configured to:
change the tool exchanging position to a different position in response to receiving a change of the tool exchanging position; and
control the head section driving device in accordance with the change of the tool exchanging position.

5. The machine tool of claim 1, wherein
the first rotation axis of the spindle is disposed along an axial direction parallel to an installation surface of the machine tool, and
the head section driving device is configured to move the head section along the axial direction, and the tool exchanging position is set at a position along the axial direction spaced apart from the spindle.

6. The machine tool of claim 1, wherein
the second rotation axis extends in the vertical direction of the machine tool.

* * * * *